US011313770B2

(12) United States Patent
Scheidecker et al.

(10) Patent No.: US 11,313,770 B2
(45) Date of Patent: Apr. 26, 2022

(54) METHOD FOR ONLINE SAMPLING AN ALIQUOT FROM A MOBILE PHASE COMPRISING AN ANALYTE OF AN APPARATUS FOR PRODUCING A PHARMACEUTICAL OR CHEMICAL PRODUCT

(71) Applicant: Hoffmann-La Roche Inc., Little Falls, NJ (US)

(72) Inventors: Benedikt Scheidecker, Ottobrunn (DE); Reinhard Braaz, Penzberg (DE); Josef Vinnemeier, Schlehdorf (DE); Agathe Justine Ballin, Bichl (DE)

(73) Assignee: HOFFMAN-LA ROCHE INC., Little Falls, NJ (US)

( * ) Notice: Subject to any disclaimer, the term of this patent is extended or adjusted under 35 U.S.C. 154(b) by 51 days.

(21) Appl. No.: 16/461,891

(22) PCT Filed: Nov. 22, 2017

(86) PCT No.: PCT/EP2017/079998
§ 371 (c)(1),
(2) Date: May 17, 2019

(87) PCT Pub. No.: WO2018/099775
PCT Pub. Date: Jun. 7, 2018

(65) Prior Publication Data
US 2019/0277730 A1    Sep. 12, 2019

(30) Foreign Application Priority Data
Nov. 29, 2016 (EP) ..................... 16201212

(51) Int. Cl.
*G01N 1/20* (2006.01)
*B01L 3/02* (2006.01)

(52) U.S. Cl.
CPC .......... *G01N 1/2035* (2013.01); *B01L 3/0296* (2013.01); *B01L 2300/0672* (2013.01);
(Continued)

(58) Field of Classification Search
CPC ................. G01N 1/2035; B01L 3/0296; B01L 2300/0672; B01L 2300/0832; B01L 2400/0605
See application file for complete search history.

(56) References Cited

U.S. PATENT DOCUMENTS 3,681,997 A * 8/1972 Allen .................... G01N 1/2035
                                                          73/863.61
3,776,042 A * 12/1973 Werra ..................... G01N 1/14
                                                          73/863.85
(Continued)

FOREIGN PATENT DOCUMENTS

CN        101865795        10/2010
CN        105308449        2/2016
(Continued)

*Primary Examiner* — Jennifer Wecker
*Assistant Examiner* — Kathryn Elizabeth Limbaugh
(74) *Attorney, Agent, or Firm* — Woodard, Emhardt, Henry, Reeves & Wagner LLP (57) ABSTRACT

Methods and systems for online sampling an aliquot from a mobile phase comprising an analyte for producing a pharmaceutical or chemical product, wherein the apparatus comprises an analytical device and a tube between an inlet and an outlet, wherein the outlet is in fluid communication with the analytical device, the method comprising: providing a sample device comprising a needle with a needle tip, a septum pierceable by the needle and a pump, wherein the needle is moveable between an extended position in which the septum is pierced by the needle, and a retracted position, in which the septum is not pierced, disposing the sample device at the curved portion of the tube, moving the needle
(Continued)

to the extended position such that the needle tip faces the flow direction, and drawing out an aliquot out of the mobile phase.

29 Claims, 2 Drawing Sheets

(52) U.S. Cl.
CPC ............... *B01L 2300/0832* (2013.01); *B01L 2400/0605* (2013.01)

(56) References Cited

U.S. PATENT DOCUMENTS

| | | | |
|---|---|---|---|
| 3,779,082 A * | 12/1973 | Galloway | G01N 1/14 |
| | | | 73/863.85 |
| 4,785,676 A * | 11/1988 | DeOca | G01N 1/10 |
| | | | 141/329 |
| 5,716,525 A | 2/1998 | Nickerson | |
| 8,408,078 B2 * | 4/2013 | Mennenga | C12M 37/04 |
| | | | 73/863.85 |
| 2002/0014100 A1 | 2/2002 | Srinivasan et al. | |
| 2003/0110870 A1 | 6/2003 | Bigalke | |

FOREIGN PATENT DOCUMENTS

| | | | |
|---|---|---|---|
| JP | S59-157527 | 9/1984 | |
| JP | 2007187663 | 7/2007 | |
| WO | WO-2012112024 A1 * | 8/2012 | ............. G01N 30/06 |

* cited by examiner

METHOD FOR ONLINE SAMPLING AN ALIQUOT FROM A MOBILE PHASE COMPRISING AN ANALYTE OF AN APPARATUS FOR PRODUCING A PHARMACEUTICAL OR CHEMICAL PRODUCT

FIELD OF THE INVENTION

The present invention relates to a method for online sampling an aliquot from a mobile phase comprising an analyte of an apparatus for producing a pharmaceutical or chemical product.

RELATED ART

Assuring the quality of pharmaceutical or chemical products is the most important responsibility in the industry of manufacturing such as drug manufacturing. This is not only the case for the respective regulatory agencies, but especially for the manufacturing companies. The currently practiced quality assurance system follows a quality by testing approach. Product quality is ensured by testing of raw materials, in-process materials, and the end product, as well as by a fixed drug manufacturing process. To assure comparable assessments of the product quality, it is necessary that pharmaceutical manufacturing processes are tightly controlled. This causes alterations in process protocol to require comprehensive reasoning toward regulatory agencies. Moreover, tight specifications regarding end product specifications do not allow for uncertain manufacturing results to be used and therefore leading to the product getting discarded instead.

Scale up of biotechnological processes consists of three steps: developmental laboratory scale, intermediate scale and actual production scale. Experiments at intermediate scale are needed to ensure a functional and reproducible process at routine production. The scale up of biotechnological processes, however, is not trivially done for operations that are not only dependent on fluid flow. Instead, scaling can cause previously developed and optimized protocols from small scale models to perform sub-optimal in production environment, when done improperly.

Particularly, products life cycle is supposed to start by employing a systematic development with multivariate experiments. It then transitions to adjustable manufacturing within a defined design space. Most importantly, this manufacturing is supposed to leave room for innovative process analytics to give instantaneous feedback and a feed forward in real time. Due to difficulties of applying design experiments on the at-scale manufacturing, design spaces in downstream processing are usually developed in small-scale models of the process. These models are validated for the process, but do not necessarily account for scaling effects. Process solutions, like buffers with specified pH, are not trivially produced in large scale. Moreover, process equipment might not generate the same gradients as in the models due to pump size or the like. These factors, however, are accounted for with the design space of the developed process. Furthermore, process hardware, like specific chromatography column headers, can have an influence on the flow profile, which might not be observed in smaller columns.

With these difficulties in scale-up and less process knowledge being available for early stage at-scale processes than for commercial processes with long batch history, developmental manufacturing proves to be challenging. However, similar data can hardly be obtained for these at-scale production processes. This is mainly caused by the fact, that customized samples for broad characterization have to be prioritized against yield, process time and safety.

If a sample collection similar to process development can be established in a Good Manufacturing Practice (GMP) environment, small-scale data could be verified at-scale. For this, it would be necessary to develop a GMP-compliant solution to sample production processes without impacting process time, yield or system integrity.

Such a sampling system needs to ensure complete safety for the running process to meet regulatory requirements with regards to hygienic design, while allowing for a continuous sampling along the process. Moreover, it would have to generate samples that are representative of the process.

When establishing a sampling system, safety precautions that assure the process is not compromised by the system connection have to be considered. Furthermore, an appropriate separation of the sampling system in terms of hygienic design has to be provided. For the respective sample device, a solution has to be found to continuously extract a representative flow out of the process, while at the same time minimizing any effect on the process. To generate reliable data, this sampling system has to be able to generate comparable data and representative individual samples that can be aligned to the process profile. Moreover, system modularity should be evaluated to allow obtaining additional real time process knowledge. This modularity should enable an adaptable device for specific analytical needs. However, as this analysis is not part of the actual manufacturing and therefore needs to be performed in addition to the process, the ease of use has to be ensured.

SUMMARY

Disclosed herein is a method for online sampling an aliquot from a mobile phase comprising an analyte of an apparatus for producing a pharmaceutical or chemical product. Disclosed herein is also a system comprising an apparatus for producing a pharmaceutical or chemical product and a sample device.

Embodiments of the disclosed method for online sampling an aliquot from a mobile phase comprising an analyte of an apparatus for producing a pharmaceutical or chemical product and system have the features of the independent claims. Particular embodiments, which might be realized in an isolated fashion or in any arbitrary combination, are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

According to the disclosed method for online sampling an aliquot from a mobile phase comprising an analyte of an apparatus for producing a pharmaceutical or chemical product, the apparatus comprises an analytical device and a tube, wherein the tube comprises an inlet, an outlet and at least one curved portion, wherein the outlet is in fluid communication with the analytical device, wherein the curved portion is located between the inlet and the outlet, wherein a flow direction of the mobile phase is defined from the inlet to the outlet, the method comprising:
 providing a sample device comprising a needle with a needle tip, a septum pierceable by the needle and a pump, wherein the needle is moveable between an extended position in which the septum is pierced by the needle, and a retracted position, in which the septum is not pierced,
 disposing the sample device at the curved portion of the tube,
 moving the needle to the extended position such that the needle tip faces the flow direction, and
 operating the pump so as to draw an aliquot out of the mobile phase.

The term "apparatus for producing a pharmaceutical or chemical product" as used herein refers to any device or system configured to product at least one pharmaceutical or chemical product. It is to be noted that such an apparatus does not give an output in the laboratory scale but in a large or industrial product scale.

The term "mobile phase" as used herein refers to a fluid in which a mixture of various constituents is dissolved and which carries it through a structure holding another material called the stationary phase. The structure may be used for chromatographic purposes. Chromatography is a physical method of separation that distributes components to separate between the stationary phase and the mobile phase moving in a definite direction.

The term "aliquot" as used herein refers to a part of a probe or sample when the whole probe or sample may not or shall not be analyzed.

The specific construction of the apparatus is made for safety reasons in order to ensure a proper mobile phase flow. The proper mobile phase flow is ensured, among others, by the pump and the optimized flow characteristics provided by the tube and particularly in the curved portion.

With this method, aliquots from an analyte included in a product stream are drawn and may be analyzed. Therefore, a solution for easy and safe analysis of at-scale production processes in pharmaceutical or chemical manufacturing has been developed. It allows for GMP-compliant sample extraction from the product stream of the process and subsequent analysis, as well as fractionation of the mobile phase flow. This allows the implementation of analysis methods as and when required. Further, such a modular system provided optional and exchangeable extensibility of the apparatus adapted to the respective application. In addition, due to the higher data volume provided the analytical devices, a higher resolution may be provide than possible in large scale.

In order to allow for sample extraction from the product stream, a sample device including a needle is connected to a tube of the apparatus. Preferably the needle is a disposable or single-use needle. This single-use needle enables sterile sampling without compromising the integrity of the process. As the geometry causes great amounts of turbulence in the system with periodical flow detachment downstream of the needle, this can lead to recirculation and mixing in those areas. As the sample device is connected to a curved portion of the tube, system turbulence is reduced. Thus, the flow characteristics are optimized which provides safety against contamination of the system.

The sample device may be a device commercially available under the name NovaSeptum from Merck Millipore, Darmstadt, Germany. This sample device is a validated and sterilized system operable according to a plug and play principle and mountable to the tube by means of tri-clamp connectors or a port already present at the tube.

The curved portion comprises a radial inner wall portion and a radial outer wall portion. The sample device is disposed at the radial outer wall portion of the curved portion. This geometry does not exhibit periodical flow detachment patterns and can reduce the turbulence in the system. Thus, the mobile phase flow direction is always unidirectional towards the analytical device and independent from where the opening of the needle points to, the flowrate (turbulence) or other factors.

The curved portion may be curved such that tube portions of the tube adjacent the curved portion form an angle of 110° to 160°, preferably 120° to 150°, more preferably 125° to 145° and most preferably 135° between one another. Thus, a curvature providing an optimal stream profile allowing an optimized sampling is provided.

The method may further comprise providing the sample device with a check valve. Thus, a flow of the aliquots or parts thereof back into the mobile phase is prevented which prevents any contamination of the mobile phase. Thus, the GMP requirements and the system integrity is maintained or met.

The method may further comprise orienting the needle tip such that a needle opening disposed at the needle tip is arranged at an angular position relative to a main flow direction defined in a range from a first angular position, in which the needle opening faces a main flow direction of the mobile phase within the curved portion, to a second angular position, in which the needle opening faces away from the main flow direction of the mobile phase within the curved portion. Thus, the quality of results for the aliquots is improved. Further, a time dependent sampling is ensured as the risk of any back mixing with subsequent aliquots is excluded or significantly reduced.

The term "in a range from a first angular position to a second angular position" as used herein refers to the first angular position, the second angular position and any intermediate angular position therebetween.

The term "main flow direction" as used herein refers to a direction in which the mobile phase mainly flows according to a timely average value.

The needle opening may be disposed adjacent the needle tip. Thus, an opening area of the needle opening does not represent an inclined face of the needle tip itself. Rather, an opening area of the needle opening is parallel to a longitudinal axis of the needle. With other words, the needle opening faces in a lateral direction with respect to an extension direction of the needle. Such an orientation for the needle opening provides advantages in that the needle opening may not be clogged by pieces cut out of the septum when pierced. If the needle opening is disposed adjacent the needle tip, the needle tip thrills a hole into the septum rather than cutting out a piece from the septum by means of the edge of the needle opening. Further, conventional needles having the needle opening at the front most end and used at a 90° curvature of a tube involve the problem that an additional flow of the product out of the needle into the product flow within the tube or into the needle is caused depending on the respective orientation of the needle with the respect to the flow direction of the product. Such an additional flow causes an offset of the analytical results of the aliquot drawn out by the needle. Such an offset is avoided if the needle opening is arranged adjacent the needle tip.

The term "adjacent the needle tip" as used herein refers to a position close to the needle tip but not exactly at a front most position of the needle.

The method may further comprise operating the pump so as to draw a plurality of discrete aliquots. Thus, a plurality of aliquots may be analyzed so as to improve the analysis results. The volume or amount of the aliquots may be adjusted by means of the volume flow of the pump which also allows a specific resolution of the respective fractions of the aliquots.

The method may further comprise continuously operating the pump so as to continuously draw aliquots out of the mobile phase. Thus, most representative analysis results may be achieved.

The apparatus may comprise a chromatographic column in fluid communication with the inlet, wherein the mobile phase is a pharmaceutical or chemical sample and the chromatographic column prepares the sample. Thus, aliquots prepared by the chromatographic column may be drawn and analyzed.

The method may further comprise analyzing the mobile phase according to at least one analysis method within the analytical device, and analyzing the analyte of the aliquot drawn out of the mobile phase. Thus, with the present method, aliquots even from a product at large scale may be analyzed. Particularly, time dependent on- and off-line analysis is possible, a higher resolution is provided due to more data points, and a device selection as required without an extension of the apparatus is provided.

Needless to say, it is not imperative that the drawn aliquot is subject to an analysis method. Rather, other methods may be applied to the drawn aliquot. For example, the drawn aliquot may be subject to a fractionating process. The allocation of the respective fractions may be made by means of an ultraviolet/optical density tracking process or by numbering and measuring of the time the aliquot has been drawn.

The method may further comprise analyzing the analyte of the aliquot drawn out of the mobile phase within the analytical device or a further analytical device. Thus, the aliquot may be analyzed in detail providing best results.

The method may further comprise analyzing the aliquot, wherein the results of the analyzing step are associated with further information relating to the mobile phase. Thus, several distinct information on the aliquot and the mobile phase may be combined for allowing to retrieve synergistic information. A basic prerequisite in this respect is an optical density tracking process by measuring absorption which is specifically possible with the present sample device.

The disclosed system comprises an apparatus for producing a pharmaceutical or chemical product and a sample device, wherein the apparatus comprises an analytical device and a tube, wherein the tube comprises an inlet, an outlet and at least one curved portion, wherein the outlet is in fluid communication with the analytical device, wherein the curved portion is located between the inlet and the outlet, wherein a flow direction of a mobile phase comprising an analyte is defined from inlet to the outlet, wherein the sample device comprises a needle with a needle tip, a septum pierceable by the needle and a pump, wherein the needle is moveable between an extended position in which the septum is pierced by the needle, and a retracted position, in which the septum is not pierced, wherein the sample device is disposed at the curved portion of the tube such that the needle tip faces the flow direction in the extended position, wherein the system is configured to carry out each step of the method described before.

Thus, the system allows to draw aliquots from a mobile phase prepared at production scale. Particularly, with this system, aliquots from an analyte included in a product stream may be drawn and analyzed. Therefore, a solution for easy and safe analysis of at-scale production processes in pharmaceutical or chemical manufacturing has been developed. It allows for GMP-compliant sample extraction from the product stream of the process and subsequent analysis, as well as fractionation of the mobile phase flow. This allows the implementation of analysis methods as and when required. Further, such a modular system provided optional and exchangeable extensibility of the apparatus adapted to the respective application. In addition, due to the higher data volume provided the analytical devices, a higher resolution may be provide than possible in large scale.

In order to allow for sample extraction from the product stream, a sample device including a needle is connected to a tube of the apparatus. Preferably the needle is a disposable or single-use needle. This single-use needle enables sterile sampling without compromising the integrity of the process. As the geometry causes great amounts of turbulence in the system with periodical flow detachment downstream of the needle, this can lead to recirculation and mixing in those areas. As the sample device is connected to a curved portion of the tube, system turbulence is reduced. Thus, the flow characteristics are optimized which provides safety against contamination of the system.

The sample device may be a device commercially available under the name NovaSeptum from Merck Millipore, Darmstadt, Germany. This sample device is a validated and sterilized system operable according to a plug and play principle and mountable to the tube by means of tri-clamp connectors or a port already present at the tube.

The specific construction of the apparatus is made for safety reasons in order to ensure a proper mobile phase flow. The proper mobile phase flow is ensured, among others, by the pump and the optimized flow characteristics provided by the tube and particularly in the curved portion.

The curved portion comprises a radial inner wall portion and a radial outer wall portion, wherein the sample device is disposed at the radial outer wall portion of the curved portion. This geometry does not exhibit periodical flow detachment patterns and can reduce the turbulence in the system. The flow direction of the mobile phase is unidirectional towards the analytical device and independent from where the opening of the needle points to, the flowrate (turbulence) or other factors.

The curved portion may be curved such that tube portions of the tube adjacent the curved portion form an angle of 110° to 160°, preferably 120° to 150°, more preferably 125° to 145° and most preferably 135° between one another. Thus, a curvature providing an optimal stream profile allowing an optimized sampling is provided.

The sample device may be provided with a check valve. Thus, a flow of the aliquots or parts thereof back into the mobile phase is prevented which prevents any contamination of the mobile phase. Thus, the GMP requirements and the system integrity is maintained or met.

The needle tip may be oriented such that a needle opening disposed at the needle tip is arranged an angular position relative to a main flow direction defined in a range from a first angular position, in which the needle opening faces a main flow direction of the mobile phase within the curved portion, to a second angular position, in which the needle opening faces away from the main flow direction of the mobile phase within the curved portion. Thus, the quality of results for the aliquots is improved. Further, a time dependent sampling is ensured as the risk of any back mixing with subsequent aliquots is excluded or significantly reduced.

The needle opening may be disposed adjacent the needle tip. Thus, an opening area of the needle opening does not represent an inclined face of the needle tip itself. Rather, an opening area of the needle opening is parallel to a longitudinal axis of the needle. With other words, the needle opening faces in a lateral direction with respect to an extension direction of the needle. Such an orientation for the needle opening provides advantages in that the needle opening may not be clogged by pieces cut out of the septum when pierced. Further, conventional needles having the needle opening at the front most end and used at a 90° curvature of a tube involve the problem that an additional flow of the product out of the needle into the product flow within the tube or into the needle is caused depending on the respective orientation of the needle with the respect to the flow direction of the product. Such an additional flow causes an offset of the analytical results of the aliquot drawn out by the needle. Such an offset is avoided if the needle opening is arranged adjacent the needle tip.

The pump may be configured to draw a plurality of discrete aliquots. Thus, a plurality of aliquots may be analyzed so as to improve the analysis results.

The pump may be configured to be continuously operated so as to continuously draw aliquots out of the mobile phase. Thus, most representative analysis results may be achieved.

The apparatus may comprise a chromatographic column in fluid communication with the inlet, wherein the mobile phase is a pharmaceutical or chemical sample and the chromatographic column is configured to prepare the sample. Thus, aliquots prepared by the chromatographic column may be drawn and analyzed.

The analytical device may be configured to analyze the mobile phase according to at least one analysis method and to analyze the analyte of the aliquot drawn out of the mobile phase. Thus, with the present system, aliquots even from a product at large scale may be analyzed.

The analytical device may be configured to analyze the mobile phase according to at least one analysis method, wherein the system further comprises a further analytical device configured to analyze the analyte of the aliquot drawn out of the mobile phase. Thus, the aliquot may be analyzed in detail providing best results. Further, aliquots even from a product at large scale may be analyzed. Particularly, time dependent on- and off-line analysis is possible, a higher resolution is provided due to more data points, and a device selection as required without an extension of the apparatus is provided.

Summarizing the findings of the present invention, the following embodiments are preferred:

Embodiment 1

Method for online sampling an aliquot from a mobile phase comprising an analyte of an apparatus for producing a pharmaceutical or chemical product, wherein the apparatus comprises an analytical device and a tube, wherein the tube comprises an inlet, an outlet and at least one curved portion, wherein the outlet is in fluid communication with the analytical device, wherein the curved portion is located between the inlet and the outlet, wherein a flow direction of the mobile phase is defined from the inlet to the outlet, the method comprising:
  providing a sample device comprising a needle with a needle tip, a septum pierceable by the needle and a pump, wherein the needle is moveable between an extended position in which the septum is pierced by the needle, and a retracted position, in which the septum is not pierced,
  disposing the sample device at the curved portion of the tube,
  moving the needle to the extended position such that the needle tip faces the flow direction, and
  operating the pump so as to draw an aliquot out of the mobile phase.

Embodiment 2

Method according to embodiment 1, wherein the curved portion comprises a radial inner wall portion and a radial outer wall portion, wherein the method further comprises disposing the sample device at the radial outer wall portion of the curved portion.

Embodiment 3

Method according to embodiment 1 or 2, wherein the curved portion is curved such that tube portions of the tube adjacent the curved portion form an angle of 110° to 160°, preferably 120° to 150°, more preferably 125° to 145° and most preferably 135° between one another.

Embodiment 4

Method according to any one of embodiments 1 to 3, further providing the sample device with a check valve.

Embodiment 5

Method according to any one of embodiments 1 to 4, further comprising orienting the needle tip such that a needle opening disposed at the needle tip is arranged at an angular position relative to a main flow direction defined in a range from a first angular position, in which the needle opening faces a main flow direction of the mobile phase within the curved portion, to a second angular position, in which the needle opening faces away from the main flow direction of the mobile phase within the curved portion.

Embodiment 6

Method according to embodiment 5, wherein the needle opening is disposed adjacent the needle tip.

Embodiment 7

Method according to any one of embodiments 1 to 6, further comprising operating the pump so as to draw a plurality of discrete aliquots out of the mobile phase.

Embodiment 8

Method according to any one of embodiments 1 to 7, further comprising continuously operating the pump so as to continuously draw aliquots out of the mobile phase.

Embodiment 9

Method according to any one of embodiments 1 to 8, wherein the apparatus comprises a chromatographic column in fluid communication with the inlet, wherein the mobile phase is a pharmaceutical or chemical sample and the chromatographic column prepares the sample.

Embodiment 10

Method according to any one of embodiments 1 to 9, further comprising analyzing the mobile phase according to at least one analysis method within the analytical device, and analyzing the analyte of the aliquot drawn out of the mobile phase.

Embodiment 11

Method according to embodiment 10, further comprising analyzing the analyte of the aliquot drawn out of the mobile phase within the analytical device or a further analytical device.

Embodiment 12

Method according to any one of embodiments 1 to 9, further comprising analyzing the aliquot, wherein the results of the analyzing of the aliquot are associated with further information relating to the mobile phase.

Embodiment 13

System comprising an apparatus for producing a pharmaceutical or chemical product and a sample device, wherein the apparatus comprises an analytical device and a tube, wherein the tube comprises an inlet, an outlet and at least one curved portion, wherein the outlet is in fluid communication with the analytical device, wherein the curved portion is located between the inlet and the outlet, wherein a flow direction of a mobile phase comprising an analyte is defined from inlet to the outlet, wherein the sample device comprises a needle with a needle tip, a septum pierceable by the needle and a pump, wherein the needle is moveable between an extended position in which the septum is pierced by the needle, and a retracted position, in which the septum is not pierced, wherein the sample device is disposed at the curved portion of the tube such that the needle tip faces the flow direction in the extended position, wherein the system is configured to carry out each step of the method according to any one of embodiments 1 to 12.

Embodiment 14

System according to embodiment 13, wherein the curved portion comprises a radial inner wall portion and a radial outer wall portion, wherein the sample device is disposed at the radial outer wall portion of the curved portion.

Embodiment 15

System according to embodiment 13 or 14, wherein the curved portion is curved such that tube portions of the tube adjacent the curved portion form an angle of 110° to 160°, preferably 120° to 150°, more preferably 125° to 145° and most preferably 135° between one another.

Embodiment 16

System according to any one of embodiments 13 to 15, wherein the sample device is provided with a check valve.

Embodiment 17

System according to any one of embodiments 13 to 16, wherein the needle tip is oriented such that a needle opening disposed at the needle tip is arranged an angular position relative to a main flow direction defined in a range from a first angular position, in which the needle opening faces a main flow direction of the mobile phase within the curved portion, to a second angular position, in which the needle opening faces away from the main flow direction of the mobile phase within the curved portion.

Embodiment 18

Method according to embodiment 17, wherein the needle opening is disposed adjacent the needle tip.

Embodiment 19

System according to any one of embodiments 13 to 18, wherein the pump is configured to draw a plurality of discrete aliquots out of the mobile phase.

Embodiment 20

System according to any one of embodiments 13 to 19, wherein the pump is configured to be continuously operated so as to continuously draw aliquots out of the mobile phase.

Embodiment 21

System according to any one of embodiments 13 to 20, wherein the apparatus comprises a chromatographic column in fluid communication with the inlet, wherein the mobile phase is a pharmaceutical or chemical sample and the chromatographic column prepares the sample.

Embodiment 22

System according to any one of embodiments 13 to 21, wherein the analytical device is configured to analyze the mobile phase according to at least one analysis method and to analyze the analyte of the aliquot drawn out of the mobile phase.

Embodiment 23

System according to any one of embodiments 13 to 21, wherein the analytical device is configured to analyze the mobile phase according to at least one analysis method, wherein the system further comprises a further analytical device configured to analyze the analyte of the aliquot drawn out of the mobile phase.

SHORT DESCRIPTION OF THE FIGURES

Further features and embodiments of the invention will be disclosed in more detail in the subsequent description of embodiments, particularly in conjunction with the dependent claims. Therein, the respective features may be realized in an isolated fashion as well as in any arbitrary feasible combination, as the skilled person will realize. The scope of the invention is not restricted by the embodiments. The embodiments are schematically depicted in the figures. Therein, identical reference numbers in these figures refer to identical or functionally comparable elements.

In the figures.

DETAILED DESCRIPTION OF THE EMBODIMENTS

Figure 1:
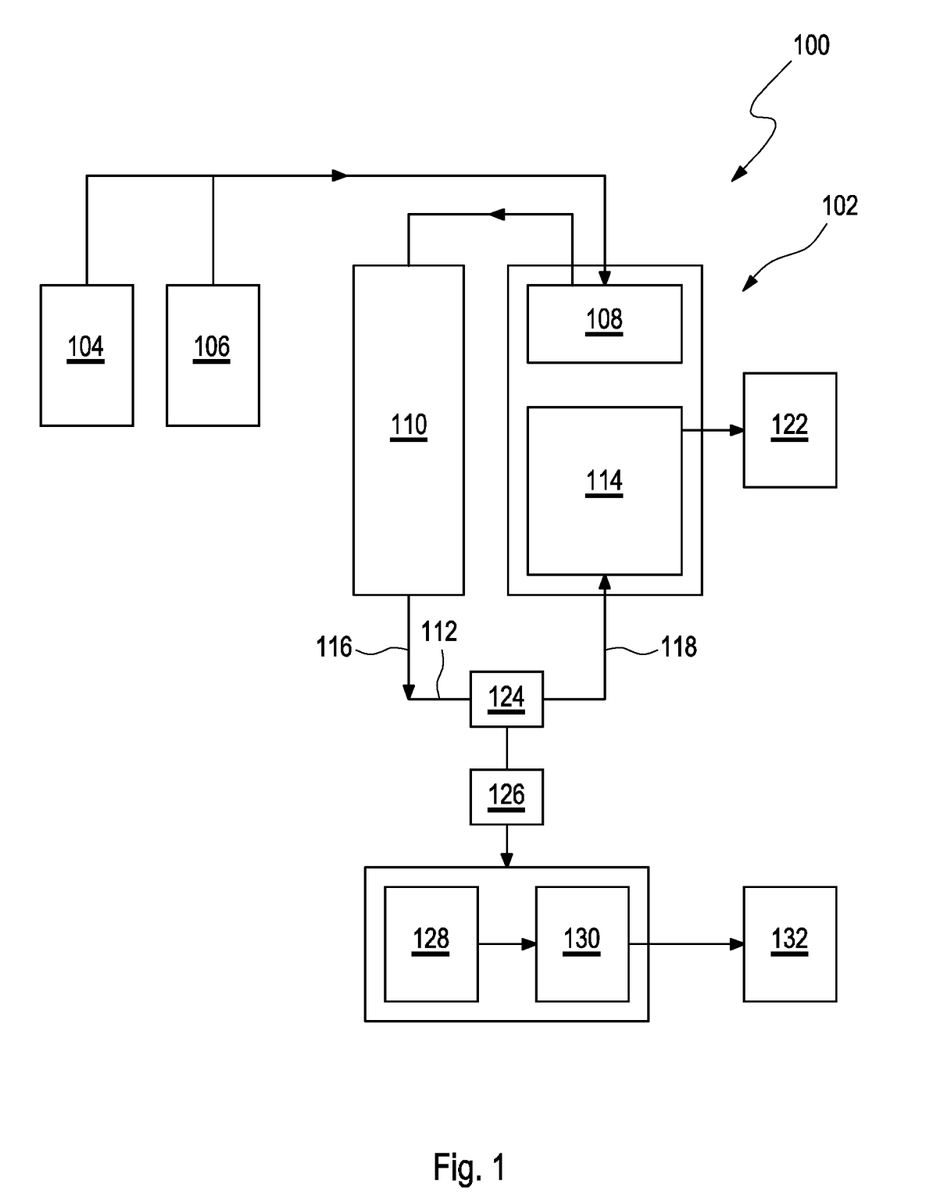
FIG. 1 shows a block diagram of a system.

FIG. 1 shows a block diagram of a system 100. The system 100 comprises an apparatus 102 for producing a pharmaceutical or chemical product. For this reason, the apparatus comprises tanks such as a tank 104 storing a buffer solution and a tank 106 storing a product solution. The tanks 104, 106 are connected to a pumping system 108 for transporting a product stream or intermediate product stream. The apparatus 102 further comprises a chromatographic column 110 connected to the pumping system 108, a tube 112 and an analytical device 114. A mobile phase at the outlet of the chromatographic column 110 comprises an analyte. The mobile phase is a pharmaceutical or chemical sample. The chromatographic column 110 is configured to prepare the sample. The tube 112 comprises an inlet 116, an outlet 118 and a curved portion 120. The chromatographic column 110 is in fluid communication with the inlet 116 of the tube 112. The outlet 118 of the tube 112 is in fluid communication with the analytical device 114. The curved portion 120 is located between the inlet 116 and the outlet 118. A flow direction of the mobile phase comprising the analyte is defined from inlet 116 to the outlet 118. The analytical device 114 is configured to analyze the mobile phase according to at least one analysis method and to analyze the analyte of an aliquot drawn out of the mobile phase as will be explained hereinafter in further detail. The analysis method may include on-line measurements such as ultra violet measurement, conductivity measurement, pH measurement and the like. The analytical device 114 is connected to a product pool 122.

The system 100 further comprises a sample device 124. The sample device 124 is disposed at the curved portion 120 of the tube 112. The sample device 124 will be described in further detail below. The sample device 124 is provided with a check valve 126. The check valve 126 may be a passive check valve such as a duckbill valve or a spring loaded check valve. The sample device 124 comprises a pump 128. The system 100 further comprises a further analytical device 130 connected to the pump 128. The further analytical device 130 is configured to analyze the analyte of the aliquot drawn out of the mobile phase by the sample device as will be explained in further detail below. The analytes analyzed by the further analytical device 130 may be separated so as to reveal product fractions 132.

Figure 2:
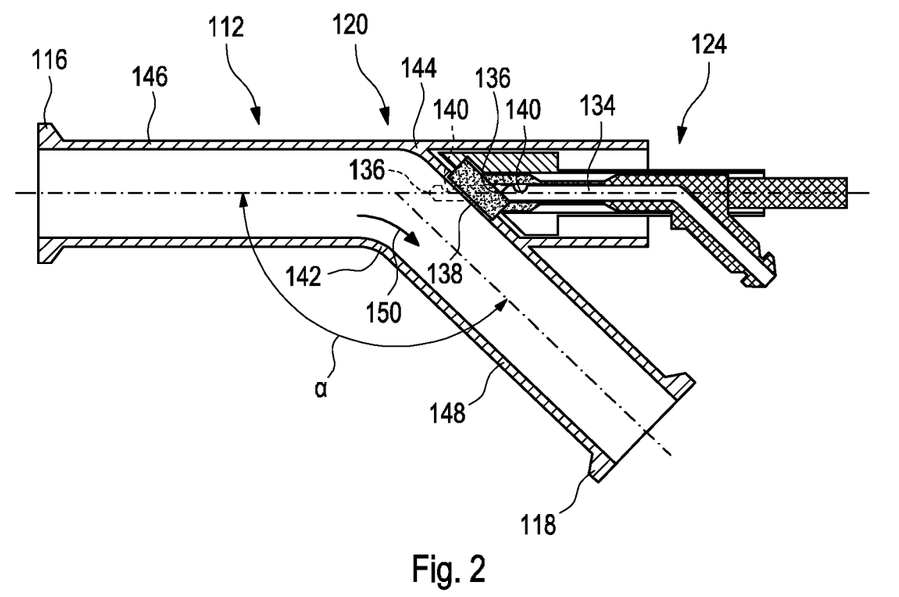
FIG. 2 shows a cross-sectional view of a sample device.

FIG. 2 shows a cross-sectional view of a sample device 124 usable with the present system 100. The sample device 124 may be a device commercially available under the name NovaSeptum from Merck Millipore, Darmstadt, Germany. The sample device 124 further comprises a needle 134 with a needle tip 136 and a septum 138 pierceable by the needle 134. As with usual needles, a needle opening 140 is disposed at the needle tip 136. In the present embodiment, it is to be noted that the needle opening 140 is arranged adjacent the needle tip 136. Thus, an opening area of the needle opening 140 does not represent an inclined face of the needle tip 136. Rather, an opening area of the needle opening 140 is parallel to the longitudinal axis of the needle 134. With other words, the needle opening faces in a lateral direction with respect to an extension direction of the needle 134. Such an orientation for the needle opening 140 provides advantages in that the needle opening may not be clogged by pieces cut out of the septum 138 when pierced. If the needle opening 140 is disposed adjacent the needle tip 136, the needle tip 136 thrills a hole into the septum 138 rather than cutting out a piece from the septum by means of the edge of the needle opening 140. The needle 134 is moveable between an extended position in which the septum 138 is pierced by the needle 134 and the needle tip 136, respectively, and a retracted position, in which the septum 138 is not pierced. The sample device 124 is disposed at the curved portion 120 of the tube 112 such that the needle tip 136 faces the flow direction of the mobile phase in the extended position.

The curved portion 120 comprises a radial inner wall portion 142 and a radial outer wall portion 144. As shown in FIG. 2, the sample device 124 is disposed at the radial outer wall portion 144 of the curved portion 120. The curved portion 120 is curved such that tube portions 146, 148 of the tube 112 adjacent the curved portion 120 form an angle α of 110° to 160°, preferably 120° to 150°, more preferably 125° to 145° and most preferably 135° between one another. The angle α between the tube portions 146, 148 may be defined by centerlines of the tube portions 146, 148.

The needle 134 may be rotated around the longitudinal axis thereof. For this reason, the needle tip is oriented such that the needle opening 140 disposed at the needle tip 136 is arranged an angular position relative to a main flow direction indicated by arrow 150 defined in a range from a first angular position, in which the needle opening 140 faces the main flow direction of the mobile phase within the curved portion 120, to a second angular position, in which the needle opening 140 faces away from the main flow direction 150 of the mobile phase within the curved portion 120. FIG. 2 shows the needle opening 140 arranged in the first angular position. The pump 128 is configured to draw an aliquot out of the mobile phase by means of the needle 134 if the needle 134 is in the extended position. Particularly, the pump 128 is configured to a plurality of discrete aliquots out of the mobile phase. For example, the pump 128 is configured to be continuously operated so as to continuously draw aliquots out of the mobile phase.

Figure 3:
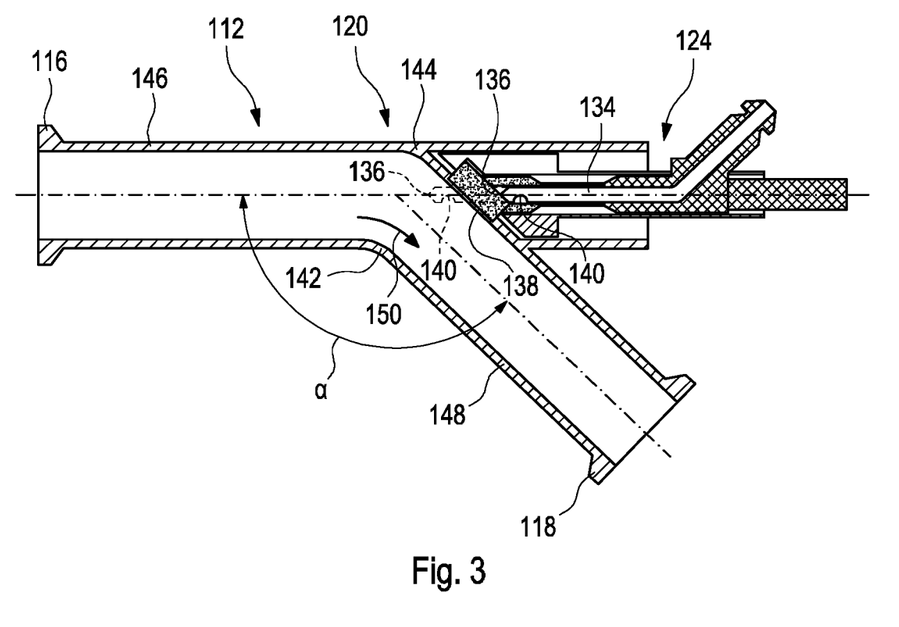
FIG. 3 shows another cross-sectional view of the sample device.

FIG. 3 shows another cross-sectional view of the sample device 124 usable with the present system 100. Hereinafter, only the differences from the sample device shown in FIG. 2 will be explained and like constructional members are indicated by identical reference numbers. With the sample device 124 shown in FIG. 3, the needle opening 140 is arranged in the second angular position.

Hereinafter, a method for online sampling an aliquot from a mobile phase comprising an analyte of the apparatus 102 for producing a pharmaceutical or chemical product will be explained. The method is carried out using the system 100 described before. The sample device 124 is provided and disposed at the curved portion 120 as described before. In other words, the sample device 124 is disposed at the radial outer wall portion 144 of the curved portion 120. The needle 134 is moved from the retracted position to the extended position while piercing the septum 138 such that the needle tip 136 faces the flow direction of the mobile phase. The needle opening 140 may be oriented at the first angular position, the second angular position or any angular position therebetween. The sample device 124 is provided with the check valve 126.

The apparatus 102 is operated so as to produce the pharmaceutical or chemical product. As mentioned above, the apparatus 102 comprises the chromatographic column 110 in fluid communication with the inlet 116 of the tube 112. The mobile phase at the outlet of the chromatographic column 110 is the pharmaceutical or chemical sample which the chromatographic column 110 prepares. This mobile phase flows through the tube 112 and passes the sample device 124. During operation of the apparatus 102, i.e. while the pharmaceutical or chemical product is produced, the pump 128 is operated so as to draw an aliquot out of the mobile phase. Particularly, the pump 128 is operated so as to draw a plurality of discrete aliquots out of the mobile phase. For example, the pump 128 is operated so as to continuously draw aliquots out of the mobile phase. The mobile phase is analyzed according to at least one analysis method within the analytical device 114. Further, the analyte of the aliquot drawn out of the mobile phase is analyzed within the analytical device 114 or the further analytical device 130. The results of the analysis of the aliquot or the plurality of aliquots are associated with further information relating to the mobile phase. For example, the mobile phase is analyzed by the analytical device 114 and the analyte of the aliquot drawn out of the mobile phase is analyzed within the further analytical device 130, wherein the results of the analysis of the aliquot within the further analytical device 130 are associated with the results of the analysis of the mobile phase within the analytical device 114. With this method, analysis results concerning the analyte may be provided within short time and associated with the respective parts of the mobile phase such that information on each of the parts of the mobile phase are provided in a timely order.

LIST OF REFERENCE NUMBERS 100 system
102 apparatus
104 tank
106 tank
108 pumping system
110 chromatographic column
112 tube
114 analytical device
116 inlet
118 outlet
120 curved portion
122 product pool
124 sample device
126 check valve
128 pump
130 further analytical device
132 product fraction
134 needle
136 needle tip
138 septum
140 needle opening
142 radial inner wall portion
144 radial outer wall portion
146 tube portion
148 tube portion
150 main flow direction
α angle

The invention claimed is:

1. A method for online analyzing an analyte in both a mobile phase and in an aliquot obtained from the mobile phase, the mobile phase comprising the analyte for producing a pharmaceutical or chemical product, wherein the method comprises:
providing an apparatus comprising an analytical device for detecting the analyte and a tube, wherein the tube comprises an inlet, an outlet and at least one curved portion located between the inlet and the outlet, wherein the outlet is in fluid communication with the analytical device, wherein the mobile phase passes through the tube in a flow direction defined from the inlet to the outlet;
providing a sample device comprising a needle with a needle tip, a septum pierceable by the needle, and a pump, wherein the needle is moveable between an extended position in which the septum is pierced by the needle, and a retracted position in which the septum is not pierced;
disposing the sample device at the curved portion of the tube;
moving the needle to the extended position such that the needle tip faces the flow direction;
operating the pump so as to draw an aliquot out of the mobile phase containing the analyte;
analyzing the analyte in the mobile phase according to at least one analysis method using the analytical device; and
analyzing the analyte in the aliquot drawn out of the mobile phase also using the analytical device.

2. The method according to claim 1, wherein the curved portion comprises a radial inner wall portion and a radial outer wall portion, wherein the method further comprises disposing the sample device at the radial outer wall portion of the curved portion.

3. The method according to claim 1, wherein the curved portion is curved such that tube portions of the tube adjacent the curved portion form an angle (α) of 110° to 160° between one another.

4. The method according to claim 1, further providing the sample device with a check valve.

5. The method according to claim 1, further comprising orienting the needle tip such that a needle opening disposed at the needle tip is arranged at an angular position relative to a main flow direction defined in a range from a first angular position, in which the needle opening faces a main flow direction of the mobile phase within the curved portion, to a second angular position, in which the needle opening faces away from the main flow direction of the mobile phase within the curved portion.

6. The method according to claim 1, further comprising operating the pump so as to draw a plurality of discrete aliquots.

7. The method according to claim 1, further comprising continuously operating the pump so as to continuously draw aliquots out of the mobile phase.

8. The method according to claim 1, wherein the apparatus comprises a chromatographic column in fluid communication with the inlet, wherein the mobile phase is a pharmaceutical or chemical sample and the chromatographic column prepares the sample.

9. The method according to claim 1, and further comprising analyzing the analyte of the aliquot drawn out of the mobile phase within the analytical device.

10. The method according to claim 1, and further comprising associating the results of the analysis of the analyte in the aliquot with the analysis of the analyte in the mobile phase.

11. A system for online analyzing an analyte in both a mobile phase and in an aliquot obtained from the mobile phase, comprising:
    an apparatus for producing an analyte for producing a pharmaceutical or chemical product and
    a sample device,
    wherein the apparatus comprises an analytical device for detecting the analyte and a tube, wherein the tube comprises an inlet, an outlet and at least one curved portion, wherein the outlet is in fluid communication with the analytical device, wherein the curved portion is located between the inlet and the outlet, wherein a flow direction of a mobile phase comprising the analyte is defined from inlet to the outlet,
    wherein the sample device comprises a needle with a needle tip, a septum pierceable by the needle and a pump, wherein the needle is moveable between an extended position in which the septum is pierced by the needle, and a retracted position in which the septum is not pierced,
    wherein the sample device is disposed at the curved portion of the tube such that the needle tip faces the flow direction in the extended position,
    wherein the system is configured to carry out each step of the method according to claim 1.

12. The system according to claim 11, wherein the curved portion comprises a radial inner wall portion and a radial outer wall portion, wherein the sample device is disposed at the radial outer wall portion of the curved portion.

13. The system according to claim 11, wherein the curved portion is curved such that tube portions of the tube adjacent the curved portion form an angle ($\alpha$) of 110° to 160° between one another.

14. The system according to claim 11, wherein the needle tip is oriented such that a needle opening disposed at the needle tip is arranged an angular position relative to a main flow direction defined in a range from a first angular position, in which the needle opening faces a main flow direction of the mobile phase within the curved portion, to a second angular position, in which the needle opening faces away from the main flow direction of the mobile phase within the curved portion.

15. The system according to claim 11, wherein the analytical device is configured to analyze the mobile phase according to at least one analysis method, wherein the system further comprises a further analytical device configured to analyze the analyte of the aliquot drawn out of the mobile phase.

16. The method according to claim 3, wherein the curved portion is curved such that tube portions of the tube adjacent the curved portion form an angle ($\alpha$) of 120° to 150°.

17. The method according to claim 3, wherein the curved portion is curved such that tube portions of the tube adjacent the curved portion form an angle ($\alpha$) of 125° to 145°.

18. The method according to claim 3, wherein the curved portion is curved such that tube portions of the tube adjacent the curved portion form an angle ($\alpha$) of 135°.

19. The system according to claim 13, wherein the curved portion is curved such that tube portions of the tube adjacent the curved portion form an angle ($\alpha$) of 120° to 150°.

20. The system according to claim 13, wherein the curved portion is curved such that tube portions of the tube adjacent the curved portion form an angle ($\alpha$) of 125° to 145°.

21. The system according to claim 13, wherein the curved portion is curved such that tube portions of the tube adjacent the curved portion form an angle ($\alpha$) of 135°.

22. The method of claim 1 in which the needle is parallel to the axis of the inlet of the tube.

23. The method of claim 1 in which the needle is positioned coaxial with the inlet of the tube.

24. A method for analyzing both a mobile phase and an aliquot obtained from the mobile phase, the mobile phase comprising an analyte for producing a pharmaceutical or chemical product, wherein the method comprises:
    providing an apparatus comprising an analytical device for detecting the analyte and a tube, wherein the tube comprises an inlet, an outlet and at least one curved portion located between the inlet and the outlet, wherein the outlet is in fluid communication with the analytical device, wherein the mobile phase passes through the tube in a flow direction defined from the inlet to the outlet;
    providing a sample device comprising a needle with a needle tip, a septum pierceable by the needle, and a pump, wherein the needle is moveable between an extended position in which the septum is pierced by the needle, and a retracted position in which the septum is not pierced;
    disposing the sample device at the curved portion of the tube;
    moving the needle to the extended position;
    operating the pump so as to draw an aliquot out of the mobile phase;
    analyzing the mobile phase according to at least one analysis method using the analytical device; and
    analyzing the aliquot drawn out of the mobile phase also using the analytical device.

25. The method of claim 24 wherein the analyzing of the mobile phase is analyzing for an analyte in the mobile phase.

26. The method of claim 24 wherein the analyzing of the aliquot is analyzing for an analyte in the aliquot drawn out of the mobile phase.

27. The method of claim 26 wherein the analyzing of the mobile phase is analyzing for an analyte in the mobile phase.

28. The method of claim 27 wherein both the analyzing of the mobile phase and the analyzing of the aliquot drawn out of the mobile phase are analyzing for the same analyte.

29. The method of claim 24 wherein moving the needle to the extended position comprises moving the needle such that the needle tip faces the flow direction.

* * * * *